United States Patent [19]

Rau

[11] 4,139,750
[45] Feb. 13, 1979

[54] LIQUID LEVEL INDICATING DEVICE

[75] Inventor: Karl Rau, Mühlheim, Fed. Rep. of Germany

[73] Assignee: VDO Adolf Schindling AG, Frankfurt am Main, Fed. Rep. of Germany

[21] Appl. No.: 784,735

[22] Filed: Apr. 5, 1977

[30] Foreign Application Priority Data

Apr. 8, 1976 [DE] Fed. Rep. of Germany ....... 2615256

[51] Int. Cl.² ............................................. H01H 35/18
[52] U.S. Cl. .................................... 200/84 R; 73/313; 403/90
[58] Field of Search ............... 200/84 R; 73/308, 313, 73/317, 318; 340/244 B, 244 D, 624, 625; 403/53, 57, 90, 122, 131, 142

[56] References Cited

U.S. PATENT DOCUMENTS

| 2,672,535 | 3/1954 | MacDonald | 200/84 R |
| 2,826,919 | 3/1958 | Klingler | 200/84 R |
| 3,059,948 | 10/1962 | Thompson | 403/90 |
| 3,482,237 | 12/1969 | Hamburg | 200/84 R |
| 3,604,044 | 9/1971 | Johnson | 403/90 |
| 3,890,478 | 6/1975 | Riddel | 200/84 R |

FOREIGN PATENT DOCUMENTS 8909 of 1912 United Kingdom .................. 200/84 R Primary Examiner—Gerald P. Tolin
Attorney, Agent, or Firm—Otto John Munz

[57] ABSTRACT

A liquid level indicating device for indicating a predetermined liquid level in a container includes a mounting member mounted on the container, a float movable with the level of liquid in the container and actuating an electrical switch when the float is at the predetermined liquid level in the container, and a coupling pivotally supporting the float on the mounting member and adjustable in orientation to permit the float to pivot in various planes. The coupling can be an angularly movable clutch such as a universal joint or a ball and socket joint or the coupling can be in the form of a resilient hinge.

11 Claims, 4 Drawing Figures

LIQUID LEVEL INDICATING DEVICE

BACKGROUND OF THE INVENTION

1. Field of the Invention

The present invention pertains to liquid level indicating devices and, more particularly, to such devices for indicating a predetermined liquid level in a container of the type utilizing a float pivotally supported on a mounting member mounted on the container.

2. Discussion of the Prior Art

Devices for indicating a predetermined liquid level in a container utilizing a float for actuating a switch are known in the prior art, the float normally being supported on a mounting member so as to be pivotal in a predetermined plane. The mounting member is formed of a threaded pipe connection with a hexagonal flange for screwing the mounting member into a corresponding threaded bore in the container; for example, into the threaded bore for an oil drain plug screw in the crankshaft housing of a motor vehicle. Such prior art devices have the disadvantages of being accurately operable only in a specific position or orientation of use and, therefore, being extremely difficult and time consuming to install. For instance, the correct orientation of such devices within a container must be determined for each device on a trial and error basis requiring the insertion of various spacers thereby rendering installation of such devices time consuming and expensive.

SUMMARY OF THE INVENTION

Accordingly, it is a primary object of the present invention to overcome the above mentioned disadvantages of the prior art by providing a liquid level indicating device which can be quickly installed on a container in the correct orientation.

An additional object of the present invention is to mount the float of a liquid level indicating device on a mounting member by means of an angularly movable clutch to simplify installation of the device.

The present invention has another object in that a liquid level indicating device utilizes a coupling for pivotally supporting a float on a mounting member, the coupling permitting to permit the float to pivot in various planes.

Some of the advantages of the present invention over the prior art are that the liquid level indicating device of the present invention can be utilized independent of orientation or position of use, the device is inexpensive to produce and simple and inexpensive to install, and no adjustment of the pivotal plane of the float of the device is required.

The present invention is generally characterized in a liquid level indicating device for indicating a predetermined liquid level in a container including a mounting member adapted to be mounted on the container, a float movable with the level of liquid in the container, an electrical switch actuated by the float when the float is at the predetermined liquid level in the container, and a coupling pivotally supporting the float on the mounting member to permit the float to pivot in various planes.

Other objects and advantages of the present invention will become apparent from the following description of the preferred embodiments taken in conjunction with the accompanying drawings.

DESCRIPTION OF THE PREFERRED EMBODIMENTS

Figure 1:
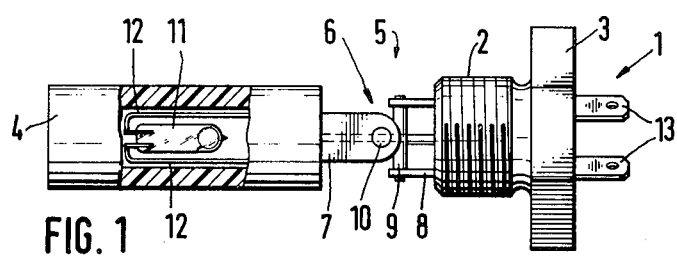
FIG. 1 is a side elevation partly in section of a liquid level indicating device according to the present invention utilizing a universal coupling.

A first embodiment of a liquid level indicating device according to the present invention is illustrated in FIG. 1 and includes a mounting member 1 having an externally threaded nipple 2 adapted to be screwed into a threaded bore in a container, not shown, with a hexagonal flange 3 disposed externally of the container. A float 4 is disposed within the container and adapted to be movable with the level of liquid therein, and the float 4 is connected with the mounting member 1 by means of a coupling 5. The coupling 5, which may be considered an angularly movable clutch, takes the form of a universal joint 6 formed of bearing blocks 7 and 8 shaped from sheet metal and extending from the float 4 and the mounting member 1, respectively. The bearing blocks 8 carry a shaft 9 which is transverse to a shaft 10 carried by bearing blocks 7. The shafts 9 and 10 are connected together at their centers and are provided with pivot pins at their ends so as to be rotatably supported in their respective bearing blocks. A mercury electrical switch 11 is mounted in a longitudinally aligned recess or hole in float 4 and is electrically connected with prongs 13 extending from mounting member 1 by means of wires 12 which pass through central holes in shafts 9 and 10.

Figure 2:
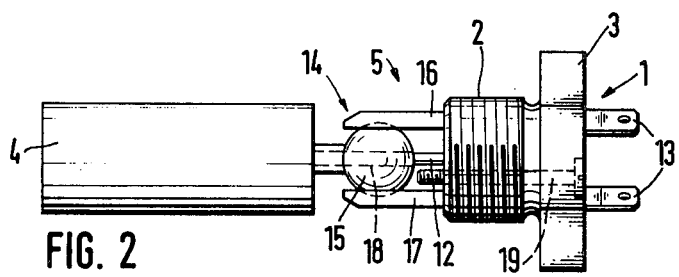
FIG. 2 is a side elevation partly in section of another embodiment of a liquid level indicating device according to the present invention utilizing a ball and socket coupling.

The embodiment of FIG. 2 is similar to the embodiment of FIG. 1 with the exception that the coupling 5 utilizes a ball and socket joint 14 to produce angularly movable clutch action; and, thus, elements in FIG. 2 identical to elements in FIG. 1 are given the same reference numbers and not described again. The ball and socket coupling 14 includes a ball 15 mounted on an extension arm on the float 4 and parallel concave support arms 16 and 17 extending from the mounting member 1 to define a concave recess for receiving the ball 5, the support arms and the ball preferably being made of plastic material. A mercury switch, not shown, is disposed within float 4 and the wires 12 from the switch pass through a bore 18 in the ball 15 to the prongs 13. A screw 19 extends through an internally threaded bore in mounting member 1 and is of a length to engage the ball 15 and fix its position during installation of the device.

With the screw 19 tightened to hold the ball in place, relative torsion between the float 4 and the mounting member 1, which may occur when the mounting member is screwed into the threaded bore in the container, is prevented since the ball cannot move in its bearing support. Once the device has been installed, the screw 19 can then be retracted to permit normal pivotal operation of the float relative to the mounting member. In this manner, any undesirable twisting of wires 12 passing between the float and the mounting member or twisting of leads of a switch which has one contact carried on the mounting member and the other contact carried by the float to undesirably alter the position of the switch parts with relation to each other is prevented.

Figure 3:
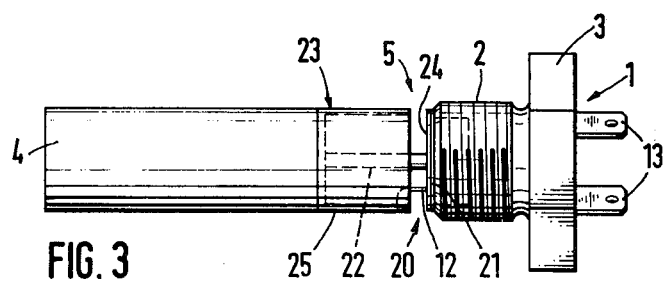
FIG. 3 is a side elevation partly in section of a further embodiment of a liquid level indicating device according to the present invention utilizing a resilient coupling.

The embodiment of FIG. 3 is similar to FIG. 1 with the exception that the coupling 5 is in the form of a resilient hinge coupling 20; and, thus, elements in FIG. 3 identical to elements in FIG. 1 are given the same reference numbers and are not described again. The resilient hinge coupling 20 is formed of a flexible member or membrane 21 carried by the mounting member 1 and a rod 22 centrally fastened to the flexible member 21 and carrying the float 4. An electrical switch 23 for this embodiment is formed of an annular contact ring 24 mounted on flexible member 21 concentric with the longitudinal axis of the rod 22 and electrically connected with one of the prongs 13 and an annular tubular contact 25 carried on float 4 and electrically connected via a wire 12 with the other one of prongs 13 such that when the float is pivoted to a position corresponding to the predetermined liquid level to be indicated, an electrical connection will be made between the contacts 24 and 25.

Figure 4:
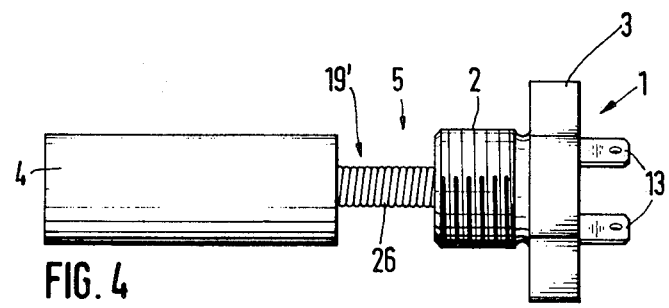
FIG. 4 is a side elevation partly in section of an additional embodiment of a liquid level indicating device according to the present invention utilizing a resilient coupling.

The embodiment of FIG. 4 differs from the embodiment of FIG. 1 only in the use of a resilient coupling 19' in place of the universal coupling 5, and elements of FIG. 5 identical to elements of FIG. 1 are given identical reference numbers and are not described again. In the embodiment of FIG. 4, a liquid level indicating device according to the present invention utilizes a resilient coupling 19' in the form of a coiled helical spring member 26 secured at one end to the mounting member 1 and carrying at the other end the float 4 which mounts an electrical switch as shown in FIG. 1.

All of the embodiments of the liquid level indicating device of the present invention function such that the angle of pivotal movement of the float is effective to operate the electrical switch in any position of the mounting member; and, accordingly, the liquid level indicating devices are operative independent of the position of use. That is, the coupling pivotally supporting the float permits the float to pivot in various planes or angles relative to the mounting member.

The liquid level indicating devices of FIGS. 1–4 operate in substantially the same manner in that the various couplings 6, 14, 20 and 19' each permit the float 4 to follow the level of liquid in the container regardless of position or orientation of the device and actuate an electrical switch upon the liquid in the container reaching a predetermined level.

While any suitable electrical switches can be used with the liquid level indicating devices of the present invention, the above described switches are particularly advantageous in that the mercury switch 11 of FIG. 1 is actuated by gravity; and, by mounting the mercury switch in a longitudinal hole along the axis of float 4, switching operation at the same liquid level is obtained regardless of the position of the liquid level indicating device. The annular contact switch 23 of FIG. 3 has the advantage of being simply and inexpensively constructed even though it should only be used with electrically non-conductive or poorly conductive liquids.

When only a small float with little bouyant force can be used with the liquid level indicating device thereby preventing mounting of a switch at or on the float, a switch responsive to pressure or traction can be mounted in the mounting member. A movable actuating element of the switch is connected through the coupling 5 to the float by means of an extremely flexible connecting element such that pivotal movement of the float flexes or bends the element to actuate the switch.

Inasmuch as the present invention is subject to many variations, modifications and changes in detail, it is intended that all matter discussed above or shown in the accompanying drawings be interpreted as illustrative and not in a limiting sense.

What is claimed is:

1. A liquid level indicating device for indicating a predetermined liquid level in a container comprising
an externally theaded mounting member in rotatable engagement with an internally threaded bore in a vertical wall of the container;
float means movable with the level of liquid in the container;
electrical switch means carried by said float means to be actuated when said float means is at the predetermined liquid level in the container; and
universal coupling means engaging with and directly supported on said mounting member and pivotally supporting said float means and permitting said float means to pivot in various planes relative to said mounting member, including a plane oblique to the vertical wall.

2. A liquid level indicating device as recited in claim 1 wherein said universal coupling means is formed of a first shaft rotatably supported on said mounting member and a second shaft rotatably supported on said float means transverse to said first shaft, said first and second shafts being connected together.

3. A liquid level indicating device as recited in claim 2 wherein said universal coupling means includes a ball and socket coupling.

4. A liquid level indicating device as recited in claim 3 wherein said ball and socket coupling includes a pair of parallel support arms extending from said mounting member to define a concave recess and a ball supported on said float means and held in said concave recess between said support arms.

5. A liquid level indicating device as recited in claim 4 wherein said coupling means includes a screw threadedly engaging said mounting member and extending therethrough to contact said ball and permit fixing of the position of said ball relative to said support arms.

6. A liquid level indicating device as recited in claim 1 wherein said universal coupling means includes a resilient hinge.

7. A liquid level indicating device as recited in claim 6 wherein said resilient hinge includes a helical spring secured to said mounting member and said float means.

8. A liquid level indicating device as recited in claim 1 wherein said electrical switch means includes a mercury switch disposed in a recess in said float means.

9. A liquid level indicating device as recited in claim 8 wherein said recess is a hole along a longitudinal axis of said float means.

10. A liquid level indicating device for indicating a predetermined liquid level in a container comprising
an externally threaded mounting member in rotatable engagement with an internally threaded bore in a vertical wall of the container;
float means movable with the level of liquid in the container; electrical switch means actuated by said float means when said float means is at the predetermined liquid level in the container including a first contact carried on said mounting member and a second contact carried on said float means and adapted to engage said first contact when the liquid in the container is at the predetermined level; and universal coupling means engaging with and directly supported on said mounting member and pivotally supporting said float means and permitting said float means to pivot in various planes relative to said mounting member including a plane oblique to the vertical wall.

11. A liquid level indicating device as recited in claim 10 wherein said universal coupling means includes a flexible member supported on said mounting member and a rod centrally mounted on said flexible member and secured to said float means, said first contact being annular and carried on said flexible member concentric with said rod and said second contact being annular and carried on said float means.

* * * * *